United States Patent [19]

Coggon

[11] Patent Number: 5,138,744
[45] Date of Patent: Aug. 18, 1992

[54] ZERO CHUCK RECLINER WITH FLOATING PAWL

[75] Inventor: Richard J. Coggon, Mississauga, Canada

[73] Assignee: Bertrand Faure Ltd., Mississauga, Canada

[21] Appl. No.: 668,659

[22] Filed: Mar. 13, 1991

[51] Int. Cl.$^5$ ............... E05D 11/10; E05D 7/00; B60N 2/02; G05G 1/00
[52] U.S. Cl. ............................... 16/325; 16/354; 297/367; 74/575; 74/577 M
[58] Field of Search ............... 16/325, 354; 297/367; 74/575, 577 M

[56] References Cited

U.S. PATENT DOCUMENTS 4,348,050  9/1982  Letournoux et al. ............... 16/325
4,523,786  6/1985  Letournoux et al. ............... 297/367
4,645,263  2/1987  Fourrey et al. ..................... 297/367

*Primary Examiner*—Robert L. Spruill
*Assistant Examiner*—Carmine Cuda
*Attorney, Agent, or Firm*—Patrick J. Hofbauer

[57] ABSTRACT

A releasably lockable hinge device comprises a pair of hingably connected hinge members rotatable about a common pivot and mutually positionable in an at least one mutually releasably locked position by a locking pawl selectively movable between locking and unlocking positions. First and second longitudinally spaced toothed portions of the locking pawl, when biased into a locking position, are interferingly wedgingly engaged with respective corresponding surfaces of the pair of hinge members, in rigidly, bridging interlocking relation therebetween.

10 Claims, 2 Drawing Sheets

ZERO CHUCK RECLINER WITH FLOATING PAWL

FIELD OF THE INVENTION

The invention relates to selectively positionable releasably locking hinge devices, and especially to adjustable car seat back hinges.

BACKGROUND OF THE INVENTION

Selectively adjustable, lockable hinges are generally well known. In essence, such hinges consist of a pair of hingably interconnected members mutually relatively rotatable about a common pivot. Prior locking devices typically include those having a pawl, which is pivotally connected to one hinge member, and which can be rotationally biased about its pivot by way of a cam acting on a cam follower surface of the pawl thereby rotating the pawl into interferring relation with teeth arranged around an arcuate portion of the other member. As a result the locked hinge is secured in locked relation by a balanced distribution of forces between the pivots of the cam, the locking pawl, and the hinge.

In many applications, including by way of example and without limitation, automobile seat back hinge applications, there is a requirement for the two members of the hinge to be rigidly locked, with a minimum of play. One element of "play" results from clearances that are necessarily a part of any device containing parts adapted for mutually relative movement. "Clearance" is the difference in size between mating parts prior to their assembly. Typically the clearance on cylindrical parts may be expressed as radial clearance or diametrical clearance. Positive clearance implies that the inside dimension of the female part is larger than the corresponding outside dimension of the male part. In typical mechanical applications a running fit requires about 0.001 inches of radial clearance for a one inch diameter shaft. A clearance of 0.003 inches on a one inch shaft is considered to be a loose fit. In typical automotive seat back hinge manufacturing, mass production processing techniques often result in clearances of 0.008 inches.

The amount of clearance typically found in seat back hinges of the type above-described, introduce an element of play called "chuck" into the mechanical system of which the hinge is a part. Note that "chuck" is not the "play" which is introduced through the flexure of any mechanical components. Rather, the term is expressly used and understood in the automobile seat back art to mean the component of play which results from mechanical lost motion due to clearances between interconnected parts, when leverage forces are applied across the hinge.

"Chuck" is a highly undesirable characteristic in automobile seat back hinges, for both safety and aesthetic reasons. In any case, considerable energy has been applied in the past in search of ways to reduce and preferably minimize "chuck".

SUMMARY OF THE INVENTION

There is provided according to the invention a selectively positionable, releasably lockable hinge device comprising a pair of hingably connected hinge members which are mutually relatively rotatable about a common pivot. These members are positionable relative to one another over a pre-determined range of relative rotation, in at least one mutually locked position, (and preferably in any one of a plurality of mutually releasably locked positions), by an elongate locking pawl that is selectively movable between locking and unlocking positions between the members. The locking pawl includes first and second longitudinally spaced, toothed portions which, when the locking pawl is biased into a locking position, are interferingly and wedgingly engaged with respective corresponding surfaces of the two members. The pawl thereby engages the two members in rigidly bridging interlocking relation. The wedging action of the locking pawl on both of the members serves to take up any radial clearances between relatively rotating parts of the hinge and its locking mechanism. As a result, the hinge of the present invention effectively eliminates chuck from the locked hinge of the present invention. The floating pawl, having no fixed pivot (or associated clearances) does not contribute to any component of "chuck".

INTRODUCTION TO THE DRAWINGS

In the course of the following detailed description of the invention, reference will be made to the accompanying drawings of which:

FIG. 1 is a partially exploded elevated side view in perspective of an automotive seat back hinge embodying a preferred form of the present invention; and, FIG. 2 is an elevated side view in cross-section through the hinge depicted in FIG. 1, illustrating locked and unlocked positions thereof.

DETAILED DESCRIPTION OF A PREFERRED EMBODIMENT

Figure 1:
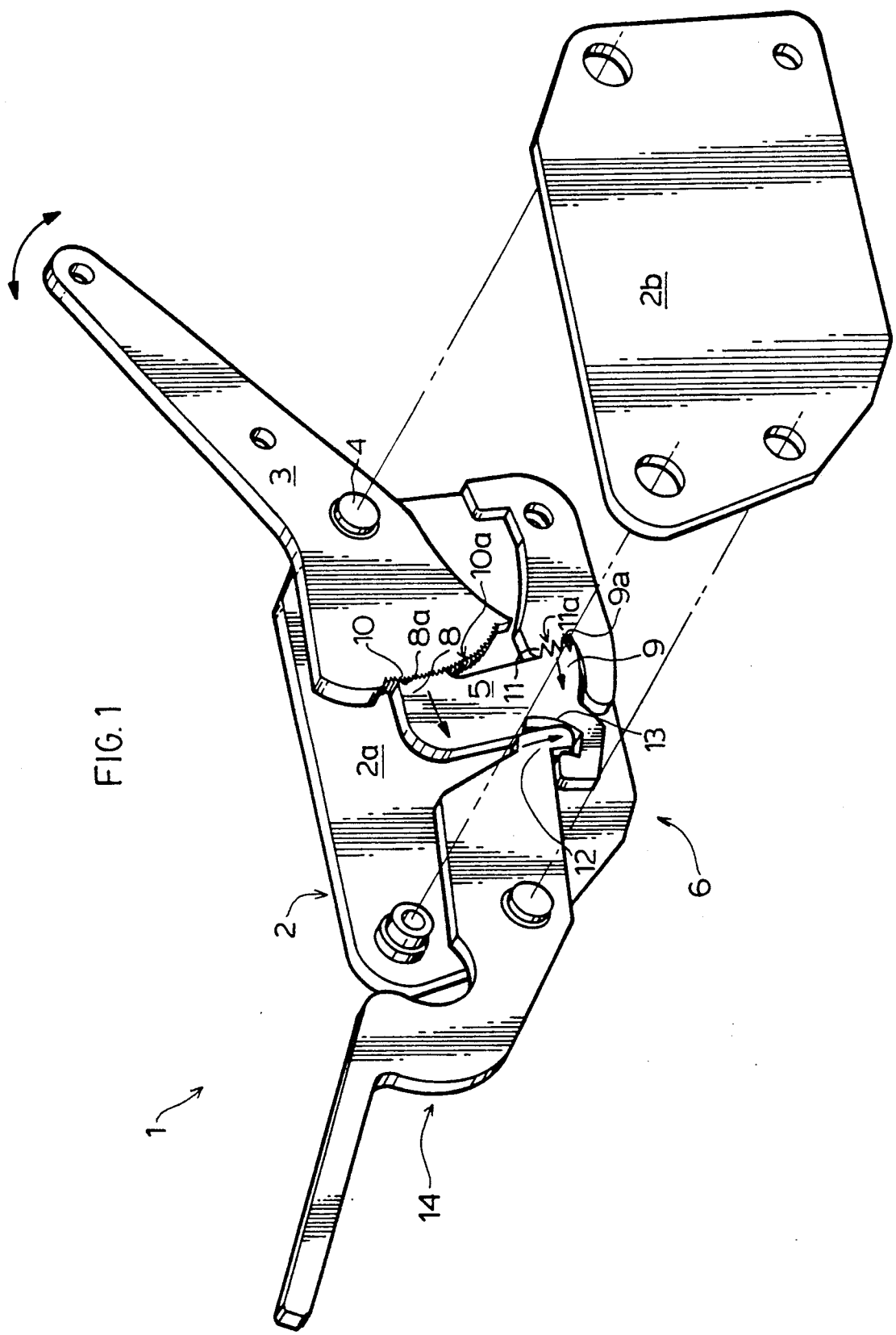

Referring now to FIG. 1 of the drawings there is illustrated a releasably lockable hinged device according to the present invention, shown in a partially exploded elevated side view of an automotive, releasably lockable seat back hinge device 1. Device 1 comprises hingedly connected means including seat hinge member 2 and seat back hinge number 3. Hinge member 2 includes a seat cushion side plate 2a, and a second, transversely aligned and spaced apart side plate 2b. The seat and seat back hinge members 2 and 3 are relatively rotatable about a common pivot 4, and are thereby mutually positionable in an at least one mutually releasably locked position.

Figure 2:
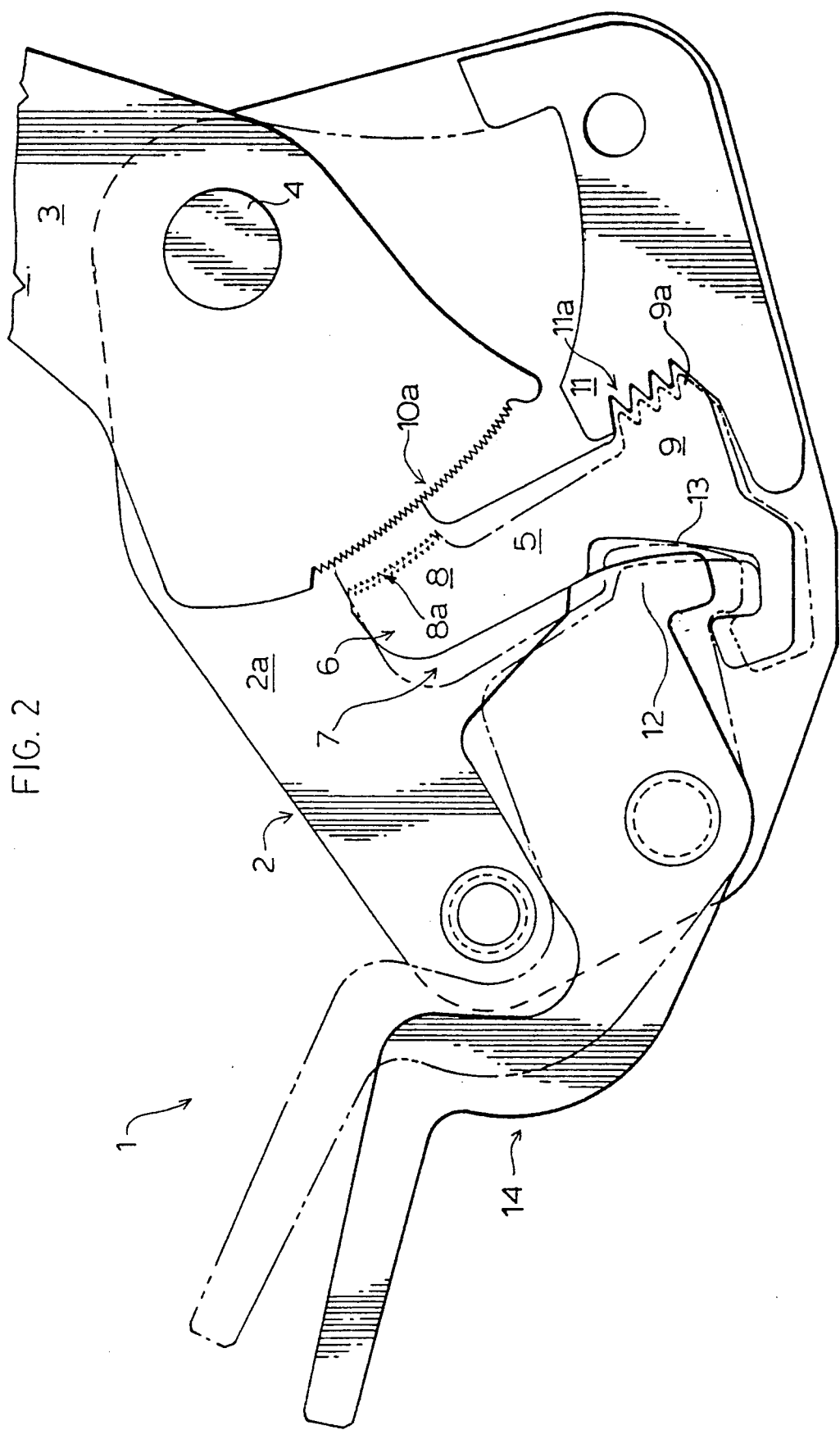

Mutual locking of the seat and seat back hinge members 2 and 3 is accomplished by way of locking pawl 5, which is selectively movable between a locking position as illustrated in FIGS. 1 and 2, and an unlocking position 7 illustrated in phantom in FIG. 2 only. A first surface portion 8 and a second surface portion 9 of pawl 5 both have teeth, 8a and 9a respectively, arranged thereon.

With the locking pawl biased into locking position 6, teeth 8a and 9a are positioned in interfering wedging engagement with teeth 10a and 11a arranged on respective corresponding surfaces 10 and 11 of seat and seat back hinge members 2 and 3. With the pawl 5 positioned thusly in locking position 6, pawl 5 engages members 2 and 3 in bridging interlocking relation therebetween. This secures members 2 and 3 against any relative mutual rotation about common pivot 4.

As illustrated, locking pawl 5 includes a cam follower surface 13 operably interconnected with a rotatable cam surface 12 which is lever operated through an integrally formed lever 14 to act against follower surface 13 and thereby bias locking pawl 5 between locking position 6 and unlocking position 7.

I claim:

1. A releasable lockable hinge device comprising:
a pair of hingably connected means rotatable about a common pivot and mutually positionable in an at least one mutually releasably locked position by an elongate locking pawl having first and second longitudinally spaced, toothed portions, the pawl being selectively movable between locking and unlocking positions, such that said first and second toothed portions are interferingly wedgingly engaged with respective corresponding surfaces of said pair of means, in rigidly, bridging interlocking relation therebetween when the locking pawl is biased into a locking position.

2. A device according to claim 1, wherein said locking pawl is biased into said locking position by a rotatable cam acting on a follower surface of said locking pawl.

3. The device according to claim 2, wherein said rotatable cam is lever operated.

4. The device according to claim 1, wherein said first spaced portion of said pawl engages an at least one of a plurality of corresponding teeth arranged along an arcuate portion of one said means, in interfering relation when the locking pawl is biased into said locking position.

5. The device according to claim 4, wherein the second spaced portion of said pawl engages a corresponding at least one tooth arranged in fixed relation to the other of said means.

6. The device according to claim 5, wherein said one means is an automobile seat back support arm, and said other of said means is an at least one automobile seat cushion side plate.

7. The device according to claim 6, wherein said other of said means comprises a pair of automobile seat cushion side plates arranged in transversely aligned, spaced apart relation on opposite sides of said support arm.

8. The device according to claim 7, wherein said locking pawl is confined in free floating relation between said side plates.

9. The device according to claim 6, wherein said corresponding at least one tooth comprises a plurality of teeth arranged in fixed relation relative to said side plate.

10. The device according to claim 9, wherein said plurality of teeth operably engage said locking pawl so as to provide a transitional pivot point for said locking pawl between said locking and unlocking positions.

* * * * *